United States Patent
Delingat et al.

(10) Patent No.: US 9,940,658 B2
(45) Date of Patent: Apr. 10, 2018

(54) CROSS BORDER TRANSACTION MACHINE TRANSLATION

(71) Applicant: PayPal, Inc., San Jose, CA (US)

(72) Inventors: Marc Delingat, Mountain View, CA (US); Hassan Sawaf, Los Gatos, CA (US); Kiran Reddy Nagarur, San Jose, CA (US); Yoram Vardi, Sunnyvale, CA (US); Alex Cozzi, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 612 days.

(21) Appl. No.: 14/586,862

(22) Filed: Dec. 30, 2014

(65) Prior Publication Data

US 2015/0248718 A1 Sep. 3, 2015

Related U.S. Application Data

(60) Provisional application No. 61/946,658, filed on Feb. 28, 2014.

(51) Int. Cl.
G06Q 30/06 (2012.01)

(52) U.S. Cl.
CPC .............................. G06Q 30/0625 (2013.01)

(58) Field of Classification Search
CPC ........................... G06Q 30/0256; G06F 17/30
USPC ....................................... 705/14.54; 707/760
See application file for complete search history.

(56) References Cited

U.S. PATENT DOCUMENTS

| 5,912,986 A | 6/1999 | Shustorovich |
| 6,028,956 A | 2/2000 | Shustorovich et al. |
| 6,321,191 B1 * | 11/2001 | Kurahashi ........... G06F 17/2765 704/7 |
| 6,865,528 B1 | 3/2005 | Huang et al. |

(Continued)

FOREIGN PATENT DOCUMENTS

| EP | 1398759 A2 | 3/2004 |
| EP | 1855211 A2 | 11/2007 |

(Continued)

OTHER PUBLICATIONS

"U.S. Appl. No. 12/606,110, Final Office Action dated Jul. 19, 2013", 20 pgs.

(Continued)

Primary Examiner — Mila Airapetian
(74) Attorney, Agent, or Firm — Maschoff Brennan

(57) ABSTRACT

A user query for items is received in a first language and translated from the first language to a second language. A result set in the second language that meets the query is obtained and is translated into the first language for presentation to the user. User feedback is used to build an ontology for optimizing the translation from the first language to the second language based on query context and the feedback. Query context may include information determined by learning semantic relationships between keywords in the query. Optimizing may include building an ontology used by a machine translator to translate key words from the first language to the second language. The number of items in the result set are measured or information is abstracted from the feedback and correlated to ontological information of the result set. The system adapts to changes in meanings in the first language over time.

15 Claims, 7 Drawing Sheets

(56) References Cited

U.S. PATENT DOCUMENTS

| | | |
|---|---|---|
| 7,269,598 B2 | 9/2007 | Marchisio |
| 7,610,189 B2 | 10/2009 | Mackie |
| 7,716,039 B1 | 5/2010 | Bangalore et al. |
| 7,716,226 B2 | 5/2010 | Barney |
| 7,805,289 B2 | 9/2010 | Zhou et al. |
| 8,463,810 B1 | 6/2013 | Rennison |
| 8,930,176 B2 | 1/2015 | Li et al. |
| 9,053,202 B2 | 6/2015 | Viswanadha et al. |
| 2002/0107683 A1 | 8/2002 | Eisele |
| 2002/0111789 A1 | 8/2002 | Hull |
| 2002/0198713 A1 | 12/2002 | Franz et al. |
| 2004/0029085 A1 | 2/2004 | Hu et al. |
| 2004/0181410 A1 | 9/2004 | Hwang |
| 2004/0243645 A1 | 12/2004 | Broder et al. |
| 2005/0005237 A1 | 1/2005 | Rail et al. |
| 2005/0015217 A1 | 1/2005 | Weidl et al. |
| 2005/0228640 A1 | 10/2005 | Aue et al. |
| 2005/0289168 A1 | 12/2005 | Green et al. |
| 2006/0142995 A1 | 6/2006 | Knight et al. |
| 2006/0241869 A1 | 10/2006 | Schadt et al. |
| 2007/0038386 A1 | 2/2007 | Schadt et al. |
| 2007/0185946 A1 | 8/2007 | Basri et al. |
| 2007/0209075 A1 | 9/2007 | Coffman |
| 2008/0025617 A1 | 1/2008 | Posse et al. |
| 2008/0040095 A1 | 2/2008 | Sinha et al. |
| 2008/0077384 A1 | 3/2008 | Agapi et al. |
| 2008/0077391 A1 | 3/2008 | Chino et al. |
| 2008/0114581 A1 | 5/2008 | Meir et al. |
| 2008/0133245 A1 | 6/2008 | Proulx et al. |
| 2008/0262826 A1 | 10/2008 | Pacull |
| 2008/0270109 A1 | 10/2008 | Och |
| 2009/0018821 A1 | 1/2009 | Sadamasa et al. |
| 2009/0070099 A1 | 3/2009 | Anisimovich et al. |
| 2009/0157380 A1 | 6/2009 | Kim et al. |
| 2009/0193003 A1* | 7/2009 | Heymans .......... G06F 17/30427 |
| 2009/0265230 A1 | 10/2009 | Plachouras et al. |
| 2009/0265290 A1 | 10/2009 | Ciaramita et al. |
| 2010/0004919 A1 | 1/2010 | Macherey et al. |
| 2010/0004920 A1 | 1/2010 | Macherey et al. |
| 2010/0070521 A1 | 3/2010 | Clinchant et al. |
| 2010/0138211 A1 | 6/2010 | Shi et al. |
| 2010/0179803 A1 | 7/2010 | Sawaf et al. |
| 2010/0180244 A1 | 7/2010 | Kalafala et al. |
| 2010/0280818 A1 | 11/2010 | Childers |
| 2011/0082683 A1 | 4/2011 | Soricut et al. |
| 2011/0125746 A1* | 5/2011 | Leary .................. B64D 45/0015 707/737 |
| 2012/0109623 A1 | 5/2012 | Dolan et al. |
| 2012/0141959 A1 | 6/2012 | von Ahn Arellano et al. |
| 2012/0158621 A1 | 6/2012 | Bennett et al. |
| 2012/0245924 A1 | 9/2012 | Brun |
| 2012/0278244 A1 | 11/2012 | Lee et al. |
| 2012/0330974 A1 | 12/2012 | Zillner |
| 2013/0030787 A1 | 1/2013 | Cancedda et al. |
| 2013/0030788 A1 | 1/2013 | Barbosa et al. |
| 2013/0144594 A1 | 6/2013 | Bangalore et al. |
| 2014/0149445 A1* | 5/2014 | Zhou .................. G06F 17/30669 707/760 |
| 2014/0278346 A1 | 9/2014 | Zomet et al. |
| 2015/0248400 A1 | 9/2015 | Sawaf |
| 2015/0248401 A1 | 9/2015 | Ruvini et al. |
| 2015/0248457 A1 | 9/2015 | Sawaf |

FOREIGN PATENT DOCUMENTS

| | | |
|---|---|---|
| EP | 1983445 A2 | 10/2008 |
| EP | 2199925 A1 | 6/2010 |
| JP | 8190562 A | 7/1996 |
| JP | 2003030186 A | 1/2003 |
| JP | 2004220266 A | 8/2004 |
| JP | 2009075795 A | 4/2009 |
| JP | 2009294747 A | 12/2009 |
| KR | 2010031800 A | 3/2010 |
| WO | WO-2001075662 A2 | 10/2001 |
| WO | WO-2003042769 A1 | 5/2003 |
| WO | WO-2005017652 A2 | 2/2005 |
| WO | WO-2005081178 A1 | 9/2005 |
| WO | WO-2005096708 A2 | 10/2005 |
| WO | WO-2006042321 A2 | 4/2006 |
| WO | WO-2008019170 A2 | 2/2008 |
| WO | WO-2009038525 A1 | 3/2009 |
| WO | WO-2010003117 A2 | 1/2010 |
| WO | WO-2010036311 A2 | 4/2010 |
| WO | WO-2010046782 A3 | 4/2010 |
| WO | WO-2015130974 A1 | 9/2015 |
| WO | WO-2015130982 A1 | 9/2015 |
| WO | WO-2015130984 A2 | 9/2015 |
| WO | WO-2015130986 A1 | 9/2015 |

OTHER PUBLICATIONS

"U.S. Appl. No. 12/606,110, Non Final Office Action dated Jun. 2, 2015", 20 pgs.

"U.S. Appl. No. 12/606,110, Non Final Office Action dated Dec. 28, 2012", 19 pgs.

"U.S. Appl. No. 12/606,110, Preliminary Amendment dated Nov. 9, 2009", 3 pgs.

"U.S. Appl. No. 12/606,110, Response filed Jan. 21, 2014 to Final Office Action dated Jul. 19, 2013", 10 pgs.

"U.S. Appl. No. 12/606,110, Response filed Mar. 28, 2013 to Non Final Office Action dated Dec. 28, 2012", 8 pgs.

"International Application Serial No. PCT/IB2009/007438, International Preliminary Report on Patentability dated May 5, 2011", 7 pgs.

"International Application Serial No. PCT/IB2009/007438, International Search Report dated Apr. 27, 2010", 2 pgs.

"International Application Serial No. PCT/IB2009/007438, Written Opinion dated Apr. 27, 2010", 5 pgs.

"International Application Serial No. PCT/US2015/017833, International Search Report dated Jul. 1, 2015", 2 pgs.

"International Application Serial No. PCT/US2015/017833, Written Opinion dated Jul. 1, 2015", 4 pgs.

"International Application Serial No. PCT/US2015/017842, International Search Report dated Jun. 3, 2015", 2 pgs.

"International Application Serial No. PCT/US2015/017842, Written Opinion dated Jun. 3, 2015", 6 pgs.

"International Application Serial No. PCT/US2015/017845, International Search Report dated Jun. 19, 2015", 2 pgs.

"International Application Serial No. PCT/US2015/017845, Written Opinion dated Jun. 19, 2015", 5 pgs.

"International Application Serial No. PCT/US2015/017848, International Search Report dated Jun. 8, 2015", 2 pgs.

"International Application Serial No. PCT/US2015/017848, Written Opinion dated Jun. 8, 2015", 6 pgs.

Ehara, Terumasa, "Rule Based Machine Translation Combined with Statistical Post Editor for Japanese to English Patent Translation", Department of Electronic Systems Engineering, Tokyo University of Science, Japan, (Sep. 2007), 4 pgs.

Eisele, et al., "Hybrid Machine Translation: Combining Rule-Based and Statistical MT Systems", EuroMatrix, (Apr. 2007), 36 pgs.

Eisele, Andreas, et al., "Hybrid Machine Translation Architectures within and beyond the EuroMatrix Project", 12th EAMT Conference, (Sep. 2008), 27-34.

Garcia-Varea, Ismael, et al., "Maximum Entropy Modeling: A Suitable Framework to Learn Context-Dependent Lexicon Modelsfor Statistical Machine Translation", Machine Learning 60, (2005), 135-158.

Och, Franz, et al., "A Systematic Comparison of Various Statistical Alignment Models", Association for Computational Linguistics, (2003), 19-51.

Sawaf, Hassan, et al., "Hybrid Machine Translation Applied to Media Monitoring", 8lh AMTA Conference, Hawaii., (Oct. 21-25, 2008), 440-447.

Sawaf, Hassan, et al., "On the Use of Grammar Based Language Models for Statistical Machine Translation", (Nov. 5, 1999), 1-13.

Sawaf, Hassan, "The AppTek MT System for the NIST Evaluation 2006—Hybrid Machine Translation for Broadcast, News, Dialect

(56) References Cited

OTHER PUBLICATIONS and Conversational Input in Arabic", AppTek Applications Technology, Inc. (Sep. 7, 2006), 11 pgs.
Ying, Liu, et al., "A Hybrid Approach to Chinese-English Machine Translation", 1997 IEEE International Conference on Intelligent Processing Systems, (Oct. 2007), 1146-1150.

\* cited by examiner

CROSS BORDER TRANSACTION MACHINE TRANSLATION

CLAIM OF PRIORITY

This application claims the benefit of priority to U.S. Provisional Patent Application Ser. No. 61/946,658, filed on Feb. 28, 2014, which is incorporated by reference herein in its entirety.

TECHNICAL FIELD

The present application relates generally to electronic commerce and, in one specific example, to techniques for machine translation for ecommerce transactions.

BACKGROUND

The use of mobile devices, such as cellphones, smartphones, tablets, and laptop computers, has increased rapidly in recent years, which, along with the rise in dominance of the Internet as the primary mechanism for communication, has caused an explosion in electronic commerce ("ecommerce"). As these factors spread throughout the world, communications between users that utilize different spoken or written languages increase exponentially. Ecommerce has unique challenges when dealing with differing languages being used, specifically an ecommerce transaction often involves the need to ensure specific information is accurate. For example, if a potential buyer asks a seller about some aspect of a product for sale, the answer should be precise and accurate. Any failing in the accuracy of the answer could result in a lost sale or an unhappy purchaser.

BRIEF DESCRIPTION OF THE DRAWINGS

Some embodiments are illustrated by way of example and not limitation in the figures of the accompanying drawings in which.

DETAILED DESCRIPTION

Example methods and systems for machine translation (MT) for ecommerce are provided. It will be evident, however, to one of ordinary skill in the art that the present inventive subject matter may be practiced without these specific details.

According to various exemplary embodiments, MT for ecommerce comprises translating a query in a first language to a query in a second language and querying an ecommerce database that is maintained in the second language to obtain a result set of items in the second language that meet the query that is in the first language. Relevancy of the result set of items to the user of the first language is measured and is used to form an ontology that may be used to optimize translation of queries in the first language to queries in the second language. In example embodiments the languages of Russian and English are used as the first language and the second language, respectively, but it will be evident to one of ordinary skill in the art that any two languages may be used as the first and second languages.

Figure 1:
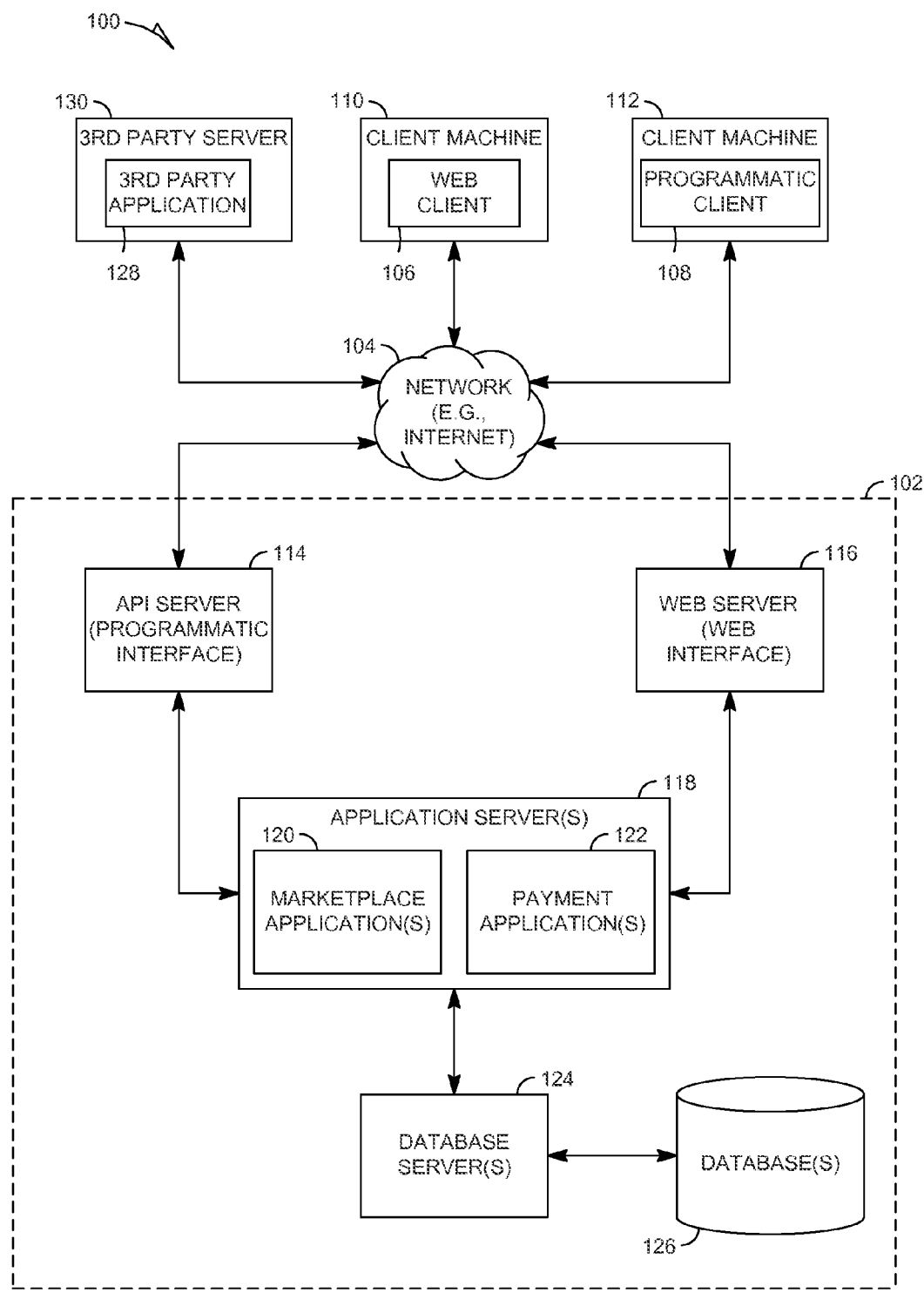
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
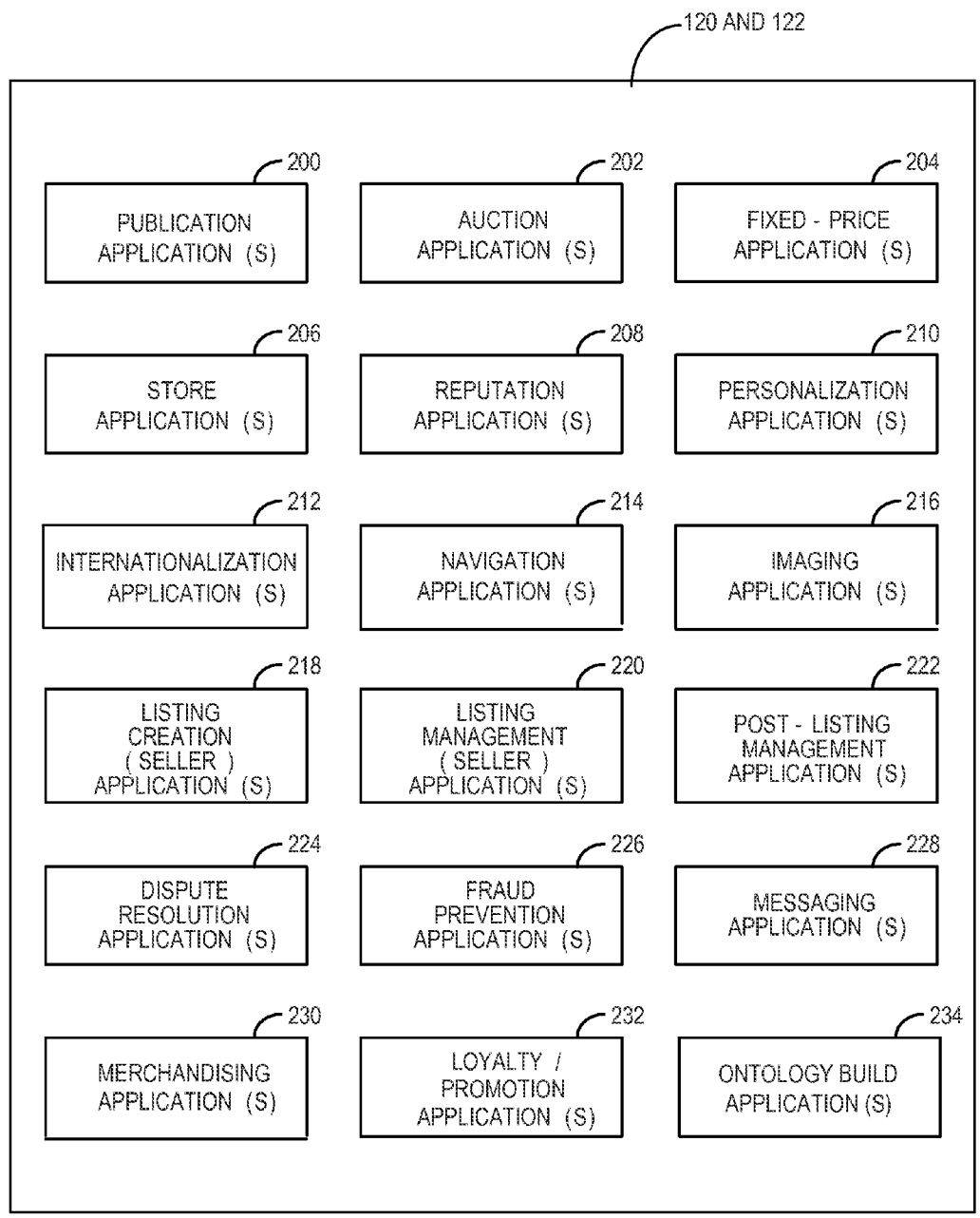
FIG. 2 is a block diagram illustrating marketplace and payment applications and that, in one example embodiment, are provided as part of application server(s) in the networked system.

FIG. 2 is a block diagram illustrating marketplace and payment applications 120 and 122 that, in one example embodiment, are provided as part of application server(s) 118 in the networked system 102. As used herein, applications may be referred to as modules. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A machine translation application 234 may translate a query in a first language to a query in a second language, obtain and build an ontology based on terms (words and/or phrases) of the query in the first language that may be combined with automatically extracted additional information from an ontology and user feedback indicating the relevancy of a result set obtained by the query that is translated into the second language. This ontology is defined by the user set of the first language and may be enriched by measuring the relevancy of the result set. A more detailed view of a machine translation application in accordance with an embodiment is seen in FIG. 2A.

Figure 2A:
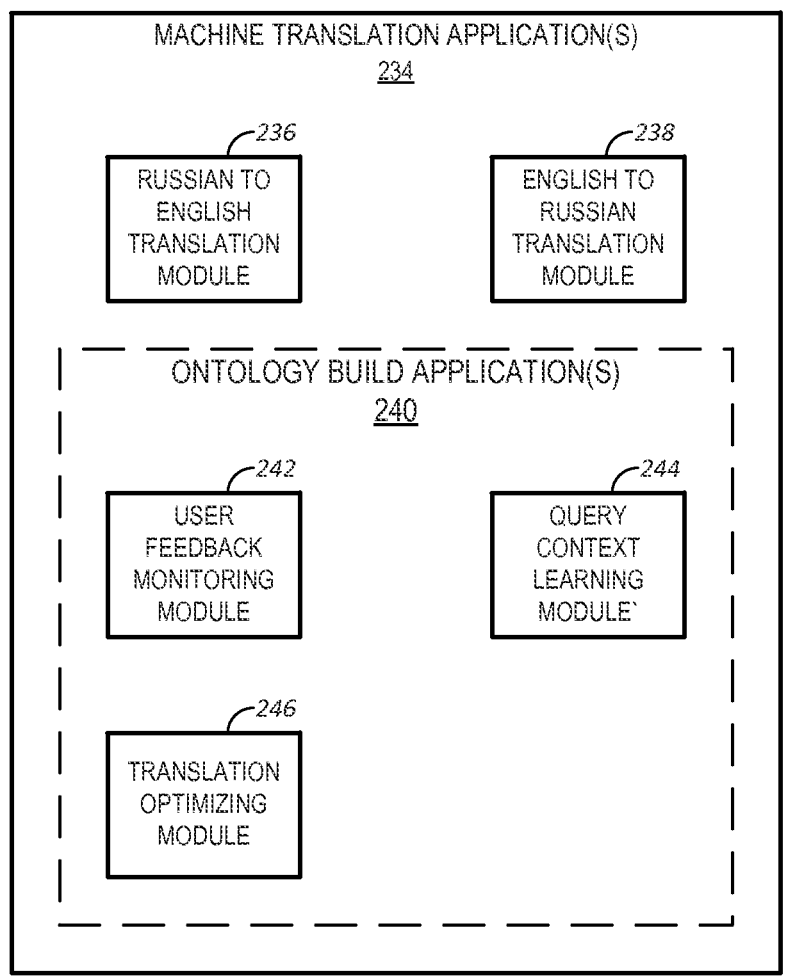
FIG. 2A is a block diagram illustrating an example machine translation application according to an example embodiment.

Machine translation application 234 is seen in additional detail in FIG. 2A. FIG. 2A is a block diagram illustrating an example machine translation application according to an example embodiment. The machine translation application comprises Russian to English translation module 236, English to Russian translation module 238, and ontology build application 240. Russian to English translation module 236 may be used to translate a query in the Russian language to a query in the English language, as more fully described at 306 in FIG. 3. English to Russian translation module 238 may be used to translate an English result set from the English language to the Russian language, as more fully described at 318 in FIG. 3. Ontology build application 240 may be used to build an ontology that may be used to optimize translating a query from the Russian language to a query in the English language, also as more fully discussed with respect to FIG. 3. Ontology build application 240 comprises user feedback monitoring module 242, query context learning module 244 and translation optimizing module 246. User feedback monitoring module 242 may be used to monitor user feedback for measuring relevancy of a result set that is provided to a user in response to a query in the Russian language, as more fully described at 318 of FIG. 3. Query context learning module 244 may be used to learn semantic relationships between keywords in a query as more fully described at 328 of FIG. 3. Translation optimizing module 246 may be used to optimize the translation of the Russian query to the English query as more fully described with respect to 306 of FIG. 3. The operation of the above modules comprising machine translation application 234 is also more fully described with respect to the method illustrated in the flowchart of FIG. 4.

Machine translation (MT) is usually focused on the translation of regular sentences of text, from political text, technical descriptions, and the like. However, MT has heretofore not been focused on the needs of a user of an ecommerce system (or other publication system). In MT of regular sentences, the objective is usually to maximize fluency, such as pieces of fluently readable text. In MT for ecommerce, however, the objective is not maximizing pieces of fluent, readable text but rather fidelity of translation of the translation units or terms. In other words, when a user enters a query in an ecommerce system, the system might focus on the translation of the keywords so that the items the system returns to the user are items that the user considers to have highest possible semantic value, or relevancy, to the query. A query may include one or more keywords describing the product or service that the user is searching for. Standard MT from one language to another, for example, Russian to English, is directed to surface forms of the text. In this standard type of missing a word or interchanging the may not have a seriously negative impact on the reader (for example using "blue" as a simplification of "navy blue", or translating "crimson" into "red"). However, in ecommerce, losing or altering even one semantic component of a user query (or keyword description of the item queried) might result in the user not purchasing the queried item from the ecommerce system or, worse, purchasing the wrong item, and in either case experiencing the user session as a negative experience. This could tend to motivate the user not to use that particular ecommerce system in the future, which is a loss to the ecommerce system. Consequently, in MT for ecommerce the focus can be said to be primarily on fidelity, not fluency, where fidelity can be viewed as returning to the user a list of items that have semantic relevancy to the user query.

Stated another way, using metrics that measure how readable translated text is, such as is done using the BLEU (Bilingual Evaluation Understudy) or METEOR (Metric for Evaluation of Translation with Explicit Ordering) metrics, may result in fluent translations. But, as alluded to above, in ecommerce the objective is to obtain precision and recall such that the overall machine translation provides a good experience for the user, by providing the user quick access to the queried item with little or no error. Otherwise the user may make a had decision because incorrect items were returned to the user, the result being an unhappy customer who is unlikely to be a repeat customer. Hence, BLEU or METEOR metrics are of little use in MT for ecommerce.

Therefore a new metric is needed determine whether the item set that is returned to the user in response to the query results in a good user experience. This metric would measure user feedback related to the returned item set. The probability of providing a good user experience may be increased by combining MT with user feedback.

Figure 3:
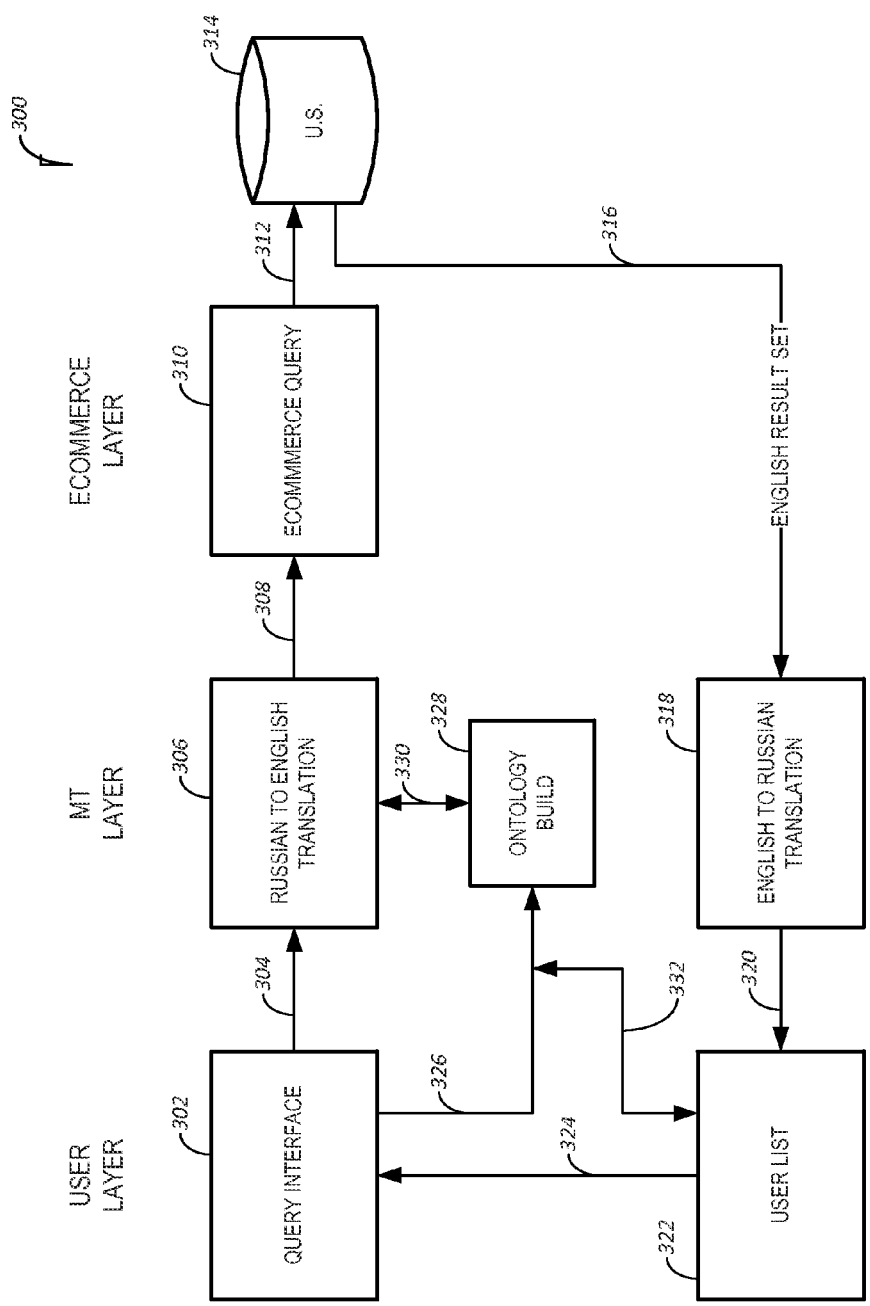
FIG. 3 is a block diagram illustrating a method of optimizing machine translation so that it is focused on ecommerce search terms, words or phrases language translation according to an example embodiment.

Products and services offered for sale on ecommerce web sites are listed in multiple languages on multiple web sites, for example, ecommerce systems such as eBay maintain web sites in different languages for different countries. eBay has sites in the United States, the UK, Russia, Spain, France, and others. FIG. 3 is a block diagram illustrating a method of optimizing machine translation so that it is focused on ecommerce keywords language translation according to an example embodiment. FIG. 3 describes a method in which a query in the Russian language may be translated into English using MT, and the English translation of the Russian query would be used to search an ecommerce system's English database for the item that was queried in Russian. User feedback relating to returned items, and word context, allows an ontology to be built that may be used to optimize the foregoing translation.

FIG. 3 illustrates three layers, a user layer, an MT layer, and ecommerce layer. A user may enter a query for an item at query interface 302 in the Russian language. The query is coupled over 304 to a Russian to English translation application 306 in the MT layer. The output 308 is the English translation of the Russian query and may be coupled to an ecommerce query application 310 in the ecommerce layer. The site at which the English translation query 308 is used may be an English language site, such as eBay's United States site or UK site. A database 314 is queried to access items in the ecommerce site inventory that meet the query. The result of that query, called here the English result set and which may be ecommerce listings for items that meet the query, is transmitted over 316 to English to Russian translation application 318 in the MT layer. The listings of items in the English result set 316 may be translated back into Russian by English to Russian translation application 318 to obtain a user list 322 of items in Russian, which is transmitted to the Russian user.

In typical MT having to do with text, there would be an interest in comparing the Russian query at 304 to the English translation of that Russian query at 308, per se. However, as discussed, the objective in MT for ecommerce is quite different. In MT for ecommerce the concern is not the comparison of the Russian to English translation. Instead, the concern is fidelity, or how relevant the English result set 316 is to the Russian query. In other words, the actual translation may even be viewed as hidden because what is important in MT for ecommerce is the fidelity of the result sets presented to the Russian user, responsive to the Russian query.

Measuring the fidelity, or relevancy, of the return set may be done using ecommerce metrics of recall and precision. Recall, as used in this context, is a measure of how large is the number of listings in the recall set. Precision is a measure of how much of that recall set is relevant to the query. High recall and high precision is the result that is sought after, implying that the result set is large (high recall) and comprises primarily relevant item listings (high precision). In one embodiment, the number of items in the English result set 316 may be used as a measure of recall. The higher the number of items in the result set the better the translation, usually, because if the translation were poor there would be relatively few items returned in the English result set. In addition, the actions of the user at 302 in response to receiving the result set may be viewed as a positive or negative user action. A positive user action, such as purchasing an item in the result set, or placing a product watch after receiving the result set, may be monitored by ontology build application 328, and used to build an ontology over a massive number of user sessions. The ontology may then be used at 330 to optimize the Russian to English translation at Russian to English translation application 306.

In one embodiment, feedback provides an indication of the relevancy of the result sets 324. The relevancy may be measured by the ontology build application 328 that builds an ontology by abstracting information from the user feedback at 326 and correlating these at 332 to the ontological information of the derived user list 322. This measurement of the relevancy of results set 324 may be accomplished in a number of ways. One way of measuring relevancy of the result set 324 is by explicit user feedback like a star rating from the user where one star may indicate that the result set 324 was not very relevant and five stars may indicate that the result set 324 was highly relevant. Another way of measuring relevancy of the result set 324 is by implicit user feedback. This may be accomplished by observing actions the user takes after receiving the result set. For example, if the user buys a product from the result set 324, or sets a watch for a product from the result set 324, this may be viewed as an implicit user feedback indication that the result set was relevant.

With continued reference to FIG. 3, the ontology of relationships can be built as alluded to above by ontology build application 328 from the data of user sessions by focusing on keywords in the Russian query. This may be done continuously by ontology build application 328. Large ecommerce systems such as eBay host millions user sessions each day. By looking at a massive number of user sessions continuously, the ontology build application can abstract information from user feedback and learn from that user feedback in order to build an ontology that can be used to optimize MT for ecommerce. But it is the users who actually define the ontology. Users do this by the products and services they place in the user queries, so that ontologies do not need to be defined explicitly by linguists but instead are learned implicitly from the data. Also, extrapolation may be done on a continual basis with only slight delay due to system infrastructure and, as the ecommerce system infrastructure improves, the delay will become shorter and shorter so that eventually the extrapolation from user sessions may be done in nearly real time. As this process continues over years and, perhaps, over decades, changes in the meaning of words that occur over time in a given language will be accounted for by the extrapolation from the user sessions over time. In other words, as word meanings changes, the system will adapt to changes in the language over time and the ontology that is continually being built by extrapolation will automatically account for, or reflect, those changes in meanings. Use cases may change over time, and there may be new use cases, but the ontology will be up to date with language changes over time. If the ontology were defined explicitly by linguists, the system would not adapt to changes in language meaning over time.

As one extrapolation example, consider a result set 324 that is relevant because it results in a positive action by the user, such as a purchase, or the like. If the user query that resulted in the positive action describes "dress" and "burgundy," then the system learns that "burgundy" in the context of "dress" cannot the same as "burgundy" in the context of "glass" (like a burgundy wine glass). Assume for the sake of example, that statistically ten users query "glass" in Russian and receive result sets from the English ecommerce site. If four of those users describe the query to include "burgundy" and "glass," and also describe in the query "red" and "wine," the context of red, wine, glass, and burgundy occur together (and provide positive feedback as to relevancy of the result set), the system will extrapolate and learn from these words in context and can connect the semantic concepts together. As such, the probability that the queries relate to "wine glass," or "red wine glass" may be very high. As another example, if a Russian user queries that resulted in positive user feedback describes "dress" and "burgundy," the probability is higher that the query is about a burgundy colored dress than that the query relates to wine, or to the Burgundy region of France. There may be other clues in the query, such as describing "red" along with "burgundy" and "dress" so that the system will learn, that, in Russian, the query is more likely to be about a red dress than about red wine or about the Burgundy region of France. Here the system will learn that "red" and "burgundy" used in the context of "dress" implies that red and burgundy are similar colors. This learning may be from extrapolating from a significant amount of data, such as user sessions, given that large ecommerce sites like eBay host millions of user sessions in one day. For smaller ecommerce sites, the system may have to wait until a statistically significant amount of data can be gathered from user sessions.

Figure 4:
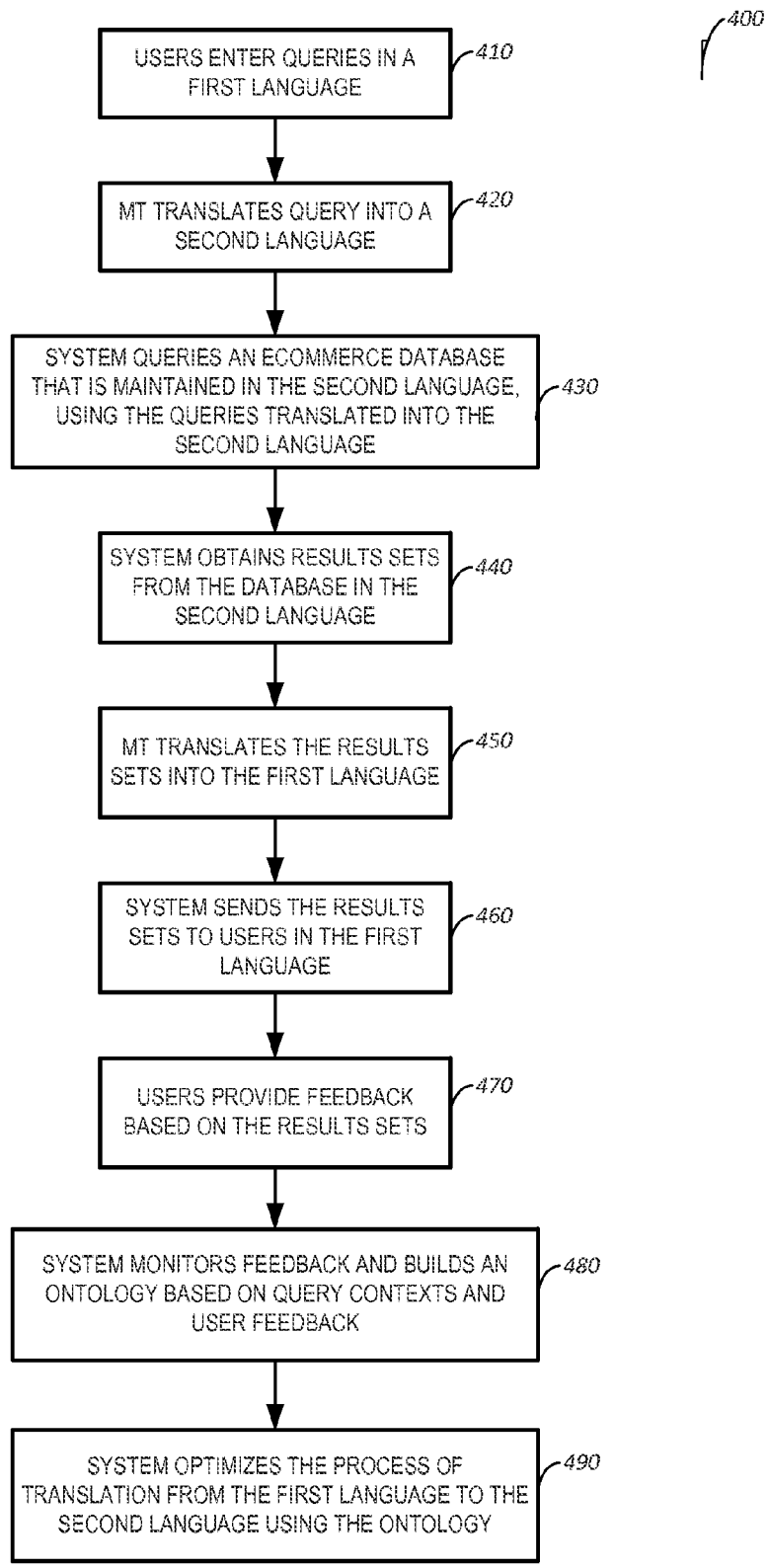
FIG. 4 is a flowchart illustrating an example method, consistent with various embodiments.

FIG. 4 is a flowchart illustrating an example method, consistent with various embodiments. At 410 of FIG. 4 a user enters a query in a first language, here Russian, as at 302 of FIG. 3. Russian to English translation module 236 of FIG. 2A then translates the query into a second language, here English, at 420 of FIG. 4. The ecommerce system then queries an ecommerce database at 430, the database being maintained in the English language. The ecommerce system obtains result sets from the database query as at 440 of FIG. 4. This result set is obtained from database 314 of FIG. 3 and at 450 of FIG. 5 the MT system translates the result set into the first language, here Russian. This translation is performed by English to Russian translation module 238 of FIG. 2A. At 460 of FIG. 4 the system sends the results set to the user in the first language, here Russian. This is seen at 324 in FIG. 3. At 470 of FIG. 4 the user provides feedback based on the result set, as discussed with respect to transmission of implicit user feedback over line 326 of FIG. 3. At 480 of FIG. 4 the system monitors the user feedback and builds an ontology based on a query context and the user feedback as explained with respect to ontology build application 328 of FIG. 3. This monitoring is undertaken by user feedback monitoring module 242 of the ontology build application 240 of FIG. 2A. Positive user feedback may be evaluated by the query context learning module 244 that then learns semantic relationships between keywords in the query as more fully described at 328 of FIG. 3. Using the user feedback and the query contexts, the ontology build application builds the ontology and the translation optimizing module 246 optimizes the process of translation from the first language, here Russian, to the second language, here English, using the ontology as more fully discussed with respect to ontology build 328 of FIG. 3.

Example Mobile Device

Figure 5:
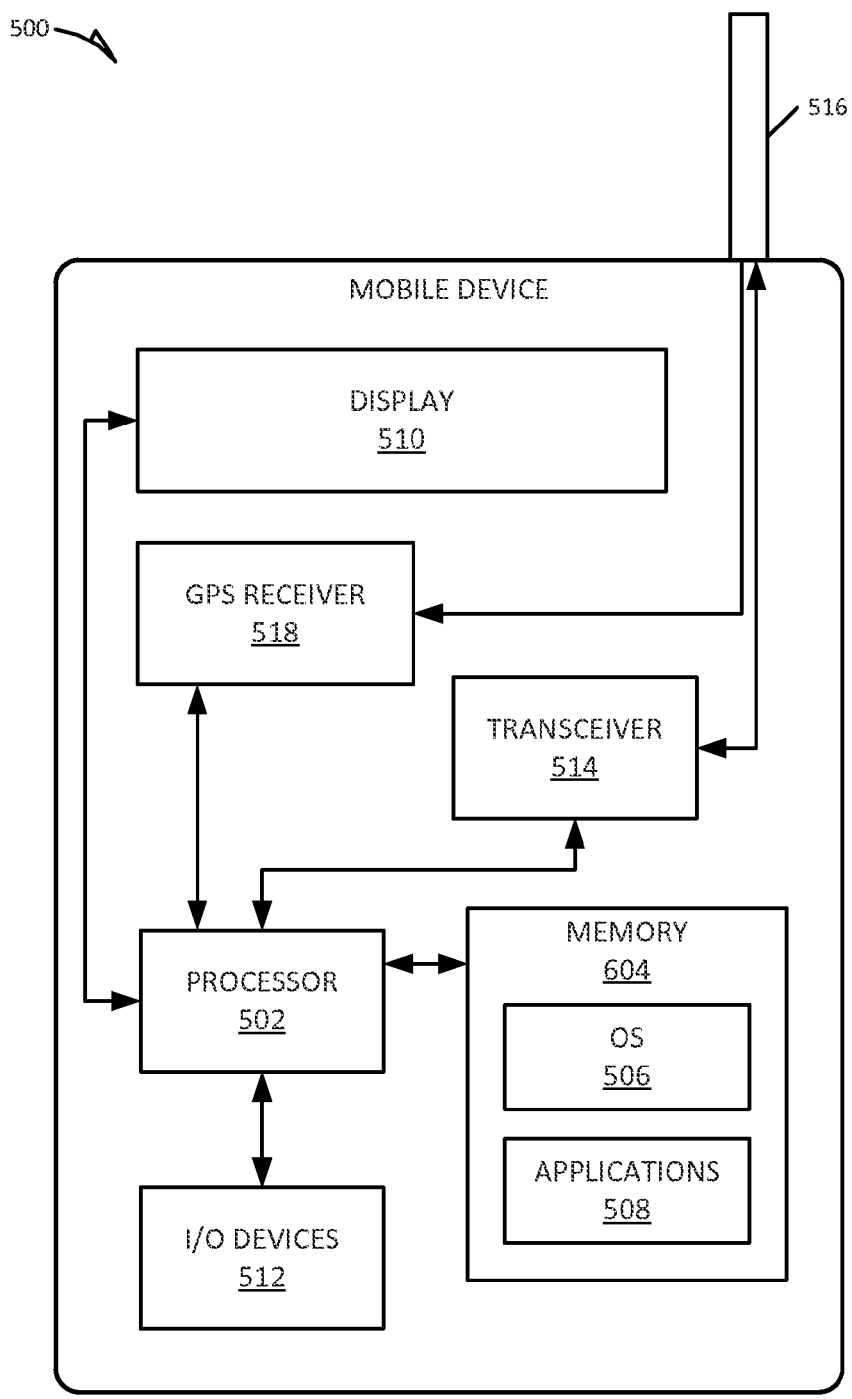
FIG. 5 is a block diagram illustrating a mobile device, according to an example embodiment.

FIG. 5 is a block diagram illustrating a mobile device 500, according to an example embodiment. The mobile device 500 may include a processor 502. The processor 502 may be any of a variety of different types of commercially available processors suitable for mobile devices (for example, an XScale architecture microprocessor, a microprocessor without interlocked pipeline stages (HIPS) architecture processor, or another type of processor 502). A memory 504, such as a random access memory (RAM), a flash memory, or other type of memory, is typically accessible to the processor 502. The memory 504 may be adapted to store an operating system (OS) 506, as well as application programs 508, such as a mobile location enabled application that may provide LBSs to a user. The processor 502 may be coupled, either directly or via appropriate intermediary hardware, to a display 510 and to one or more input/output (I/O) devices 512, such as a keypad, a touch panel sensor, a microphone, and the like. Similarly, in some embodiments, the processor 502 may be coupled to a transceiver 514 that interfaces with an antenna 516. The transceiver 514 may be configured to both transmit and receive cellular network signals, wireless data signals, or other types of signals via the antenna 516, depending on the nature of the mobile device 500. Further, in some configurations, a GPS receiver 518 may also make use of the antenna 516 to receive GPS signals.

Modules, Components and Logic

Certain embodiments are described herein as including logic or a number of components, modules, or mechanisms. Modules may constitute either software modules (e.g., code embodied (1) on machine-readable storage or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure processor 502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 502 or processor-implemented modules. The performance of certain of the operations may be distributed among the one or more processors 502, not only residing within a single machine, but deployed across a number of machines. In some example embodiments, the processor 502 or processors 502 may be located in a single location (e.g., within a home environment, an office environment or as a server farm), while in other embodiments the processors 502 may be distributed across a number of locations.

The one or more processors 502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 502, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 502 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 502), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
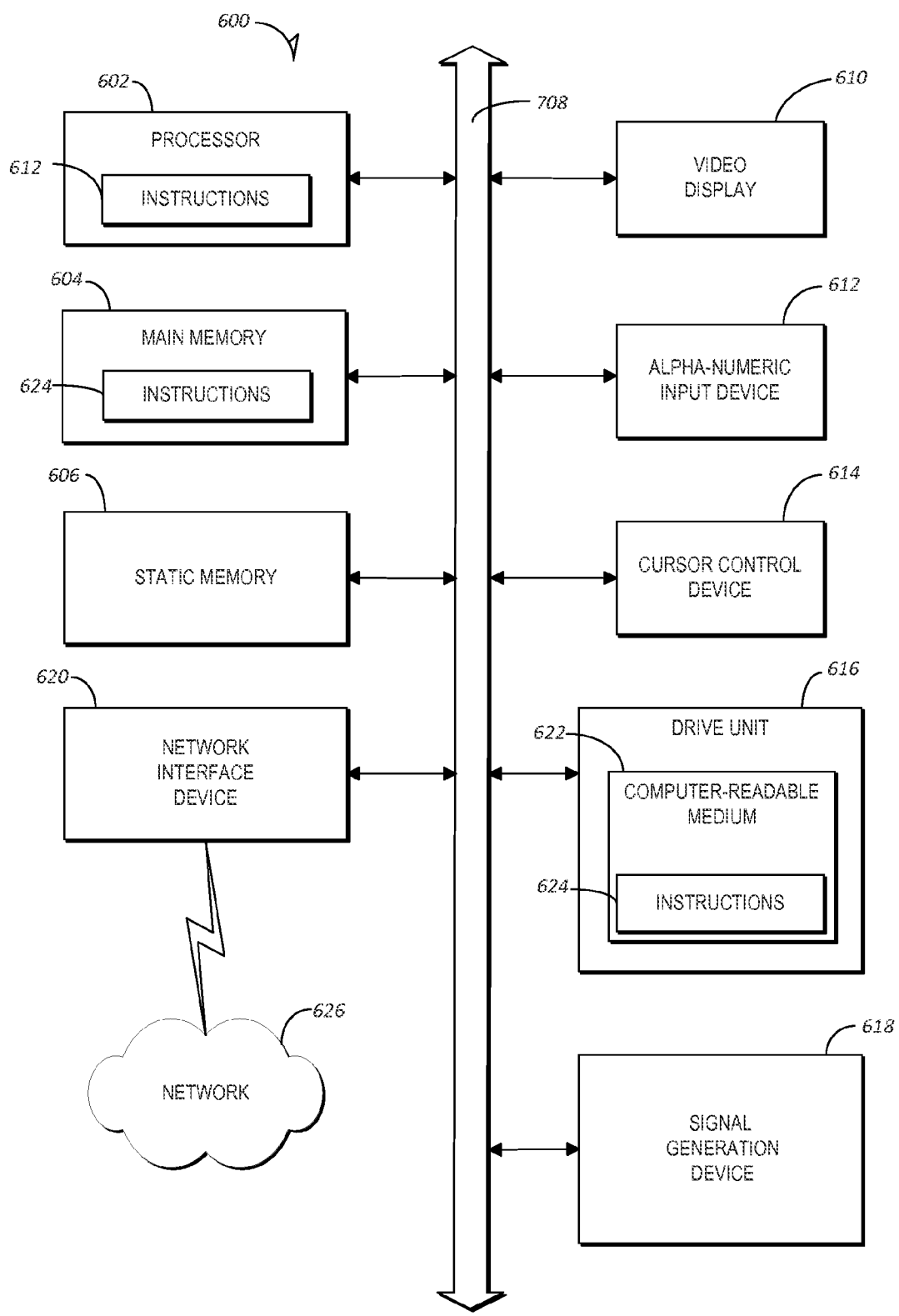
FIG. 6 is a block diagram of a machine in the example form of a computer system within which instructions may be executed for causing the machine to perform any one or more of the methodologies discussed herein.

FIG. 6 is a block diagram of machine in the example form of a computer system 600 within which instructions 624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation (e.g., cursor control) device 614 (e.g., a mouse), a disk drive unit 616, a signal generation device 618 (e.g., a speaker) and a network interface device 620.

Machine-Readable Medium

The disk drive unit 616 includes a computer-readable medium 622, which may be hardware storage, on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting computer-readable media 622.

While the computer-readable medium 622 is shown in an example embodiment to be a single medium, the term "computer-readable medium" may include a single medium or multiple media (e.g., a centralized or distributed database, and/or associated caches and servers) that store the one or more instructions 624 or data structures. The term "computer-readable medium" shall also be taken to include any tangible medium that is capable of storing, encoding or carrying instructions 624 for execution by the machine and that cause the machine to perform any one or more of the methodologies of the present disclosure or that is capable of storing, encoding or carrying data structures utilized by or associated with such instructions 624. The term "computer-readable medium" shall accordingly be taken to include, but not be limited to, solid-state memories, and optical and magnetic media. Specific examples of computer-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 724 for execution by the machine, and includes digital or analog communications signals or other intangible media to facilitate communication of such software. The system 600 may function with the Internet Protocol (IP) as a communications protocol in the Internet protocol suite for relaying datagrams across network boundaries. The routing function of the IP enables internetworking via the Internet. The Internet protocol suite, has the task of delivering packets from the source host to the destination host based on the IP addresses in the packet headers. For this purpose, IP defines packet structures that encapsulate the data to be delivered. It also defines addressing methods that are used to label the datagram with source and destination information. The connection oriented Transmission Control Protocol (TCP) may be used, often referred to as TCP/IP. The machine may operate with various versions of IP, including without limitation, Internet Protocol Version 4 (IPv4), Internet Protocol Version 6 (IPv6), and may be adapted for other and future protocols. The apparatus may function with various layers including an application layer, transport layer, Internet layer and link layer. Various transport layers may be used in addition to TCP. These transport layers may include User Datagram Protocol (UDP), Datagram Congestion Protocol (DCCP), Stream Control Transmission Protocol (SCTP), Resource Reservation Protocol (RSVP), and others.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer implemented method comprising:
receiving a query from a client machine for items, in which the query is in a first language;
translating the query into a second language, including optimizing, for ecommerce, a translation of the query from the first language into the second language based at least in part on an ontology;
obtaining a result set of items in the second language that meet the query;
translating the result set into the first language for presentation to the client machine; and
monitoring feedback from the client machine, including observing actions a user of the client machine takes relative to the result set, the actions including the user purchasing a product from the result set and placing a product watch from the result set; and building the ontology based at least on part of the observed actions such that the ontology reflects language changes over time.

2. The method of claim 1, the method further comprising building the ontology based on query context and explicit user feedback, including a rating submitted by the user of the client machine, the rating associated with user perception of a relevance of the results of the query.

3. The method of claim 2 wherein the query context comprises information determined by learning semantic relationships between keywords in the query.

4. The method of claim 2, wherein building the ontology comprises at least one of measuring a number of items in the result set or abstracting information from the feedback and correlating the feedback to ontological information of the result set.

5. The method of claim 1 wherein the query comprises a plurality of queries received over time.

6. One or more computer-readable hardware storage device having embedded therein a set of instructions which, in response to being executed by one or more processors of a computer, causes the computer to execute operations comprising:
   receiving a query from a client machine for items, the query in a first language;
   translating the query into a second language, including optimizing, for ecommerce, a translation of the query from the first language into the second language based at least in part on an ontology;
   obtaining a result set of items in the second language that meet the query;
   translating the result set into the first language for presentation to the client machine; and
   monitoring feedback from the client machine, including observing actions a user of the client machine takes relative to the result set, the actions including the user purchasing a product from the result set and placing a product watch from the result set; and
   building the ontology based at least on part of the observed actions such that the ontology reflects language changes over time.

7. The one or more computer readable hardware storage device of claim 6, the operations further comprising building the ontology based at least in part on query context and explicit user feedback, including a rating submitted by the user of the client machine, the rating associated with user perception of a relevance of the results of the query.

8. The one or more computer readable hardware storage device of claim 7 wherein the query context comprises information determined from learning semantic relationships between keywords in the query.

9. The one or more computer readable hardware storage device of claim 6, wherein building the ontology comprises at least one of measuring a number of items in the result set or abstracting information from the feedback and correlating the feedback to ontological information of the result set.

10. The one or more computer readable hardware storage device of claim 6, wherein the query comprises a plurality of queries received over time.

11. A non-transitory computer-readable medium having encoded therein programing code executable by one or more hardware processors to perform operations comprising:
   receiving a query from a client machine for items, the query in a first language;
   translating the query into a second language, including optimizing, for ecommerce, a translation of the query from the first language into the second language based at least in part on an ontology;
   obtaining a result set of items in the second language that meet the query;
   translating the result set into the first language for presentation to the client machine; and
   monitoring feedback from the client machine, including observing actions a user of the client machine takes relative to the result set, the actions including the user purchasing a product from the result set and placing a product watch from the result set; and to build the ontology based at least on part of the observed actions such that the ontology reflects language changes over time.

12. The computer-readable medium of claim 11, the operations further comprising building the ontology based at least in part on the observed actions and further based at least in part on explicit user feedback, including a rating submitted by the user of the client machine, the rating associated with user perception of a relevance of the results of the query.

13. The computer-readable medium of claim 12, the operations further comprising determining the query context by learning semantic relationships between keywords in the query.

14. The computer-readable medium of claim 11, the operations further comprising measuring a number of items in the result set or abstract information from the feedback and to correlate the feedback to ontological information of the result set.

15. The computer-readable medium of claim 11 wherein the query comprises a plurality of queries received over time.

* * * * *